UNITED STATES PATENT OFFICE.

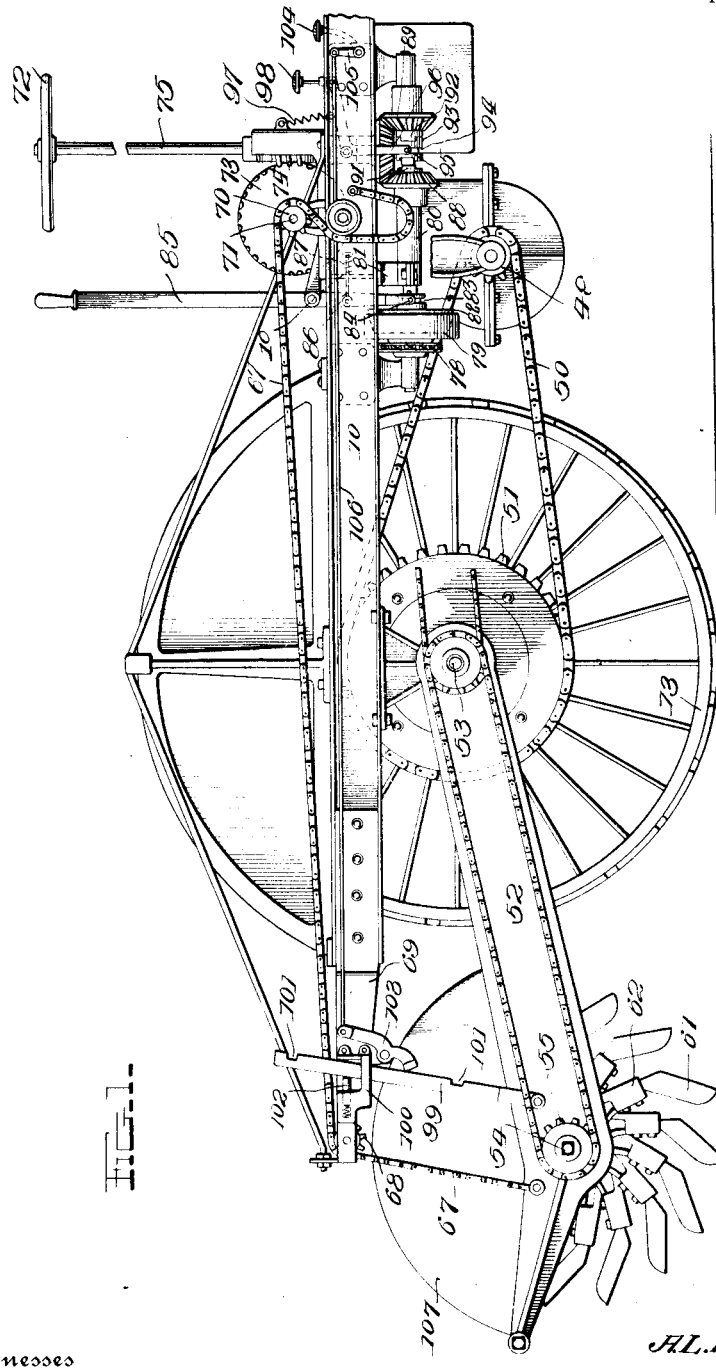

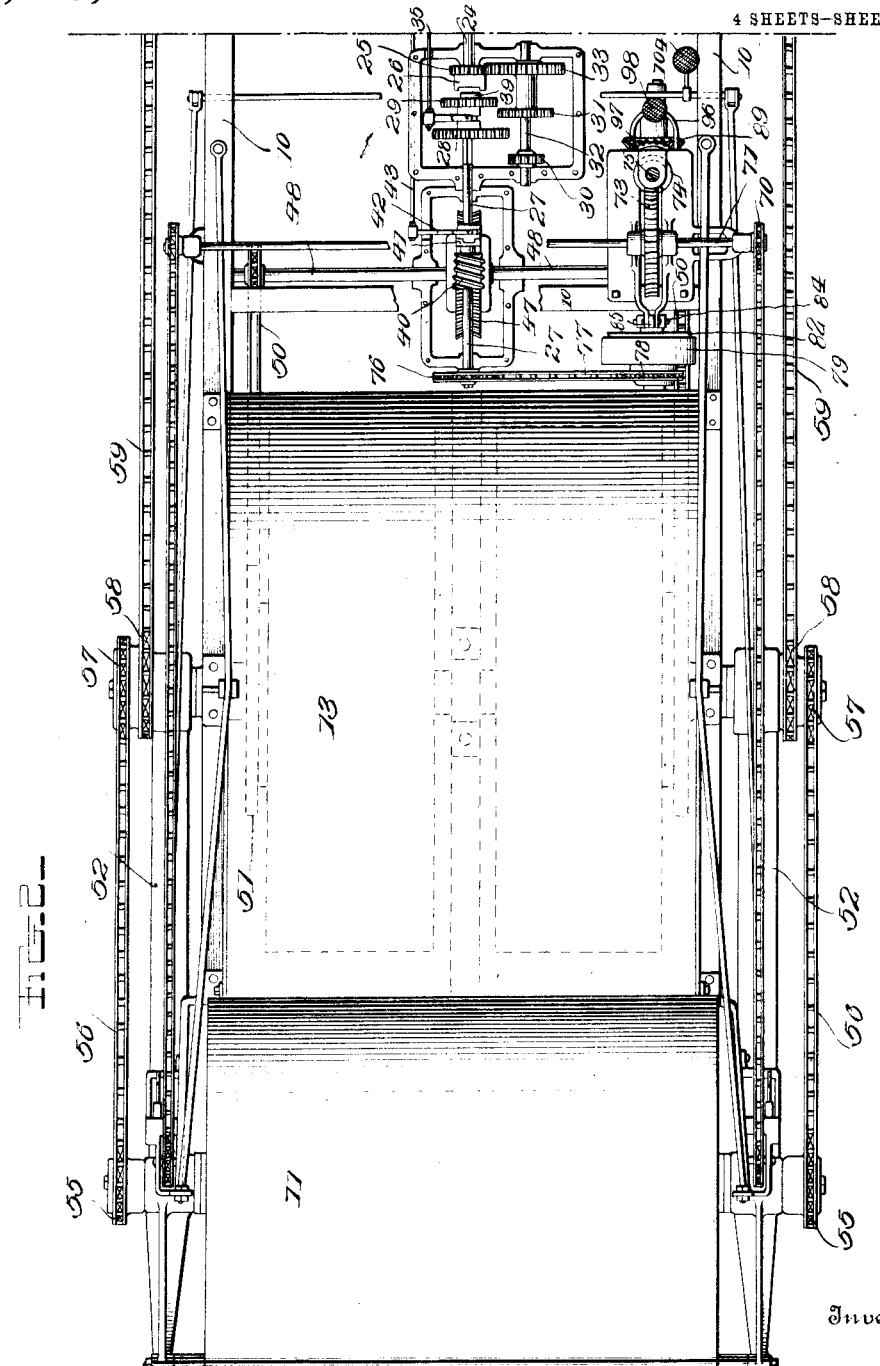

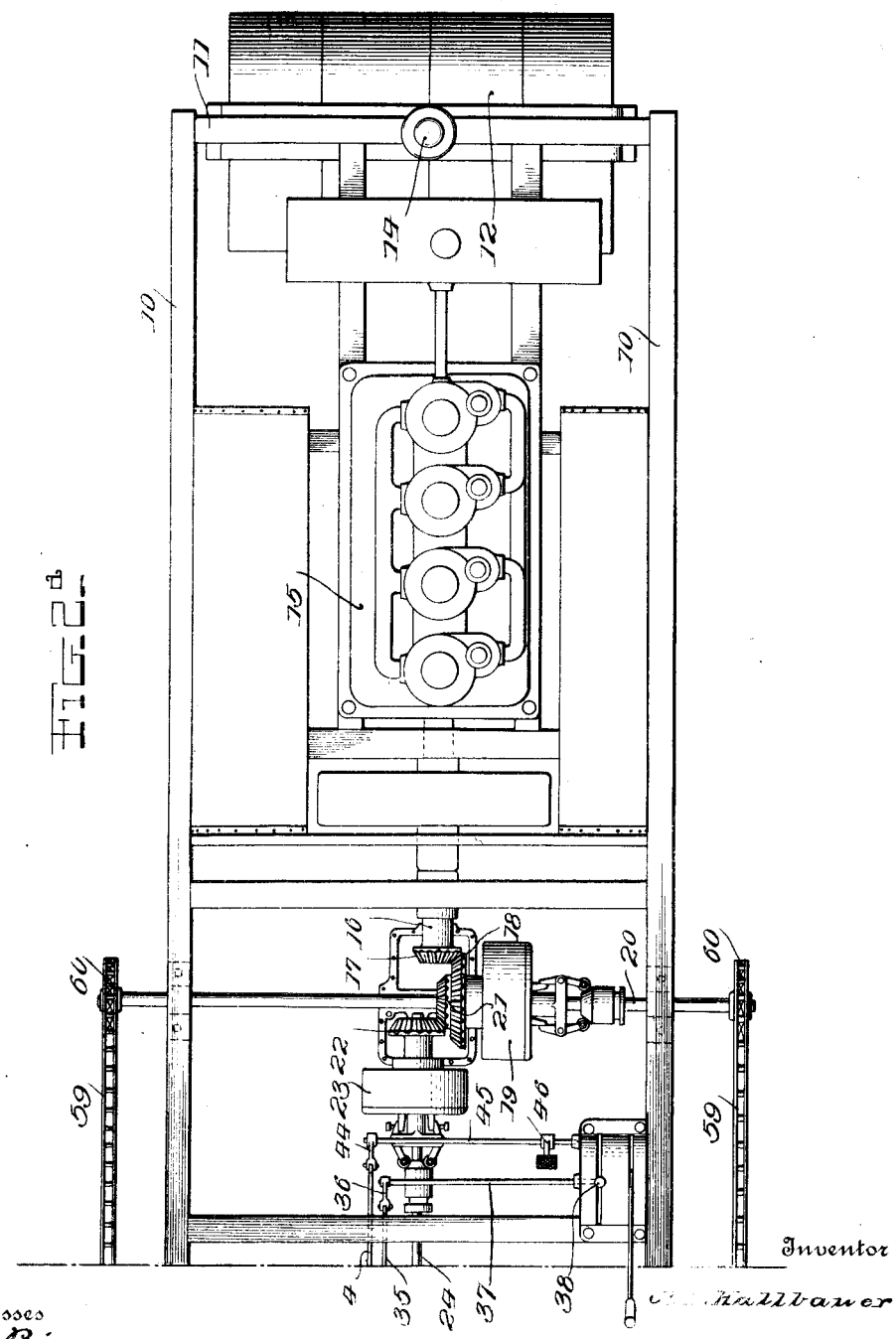

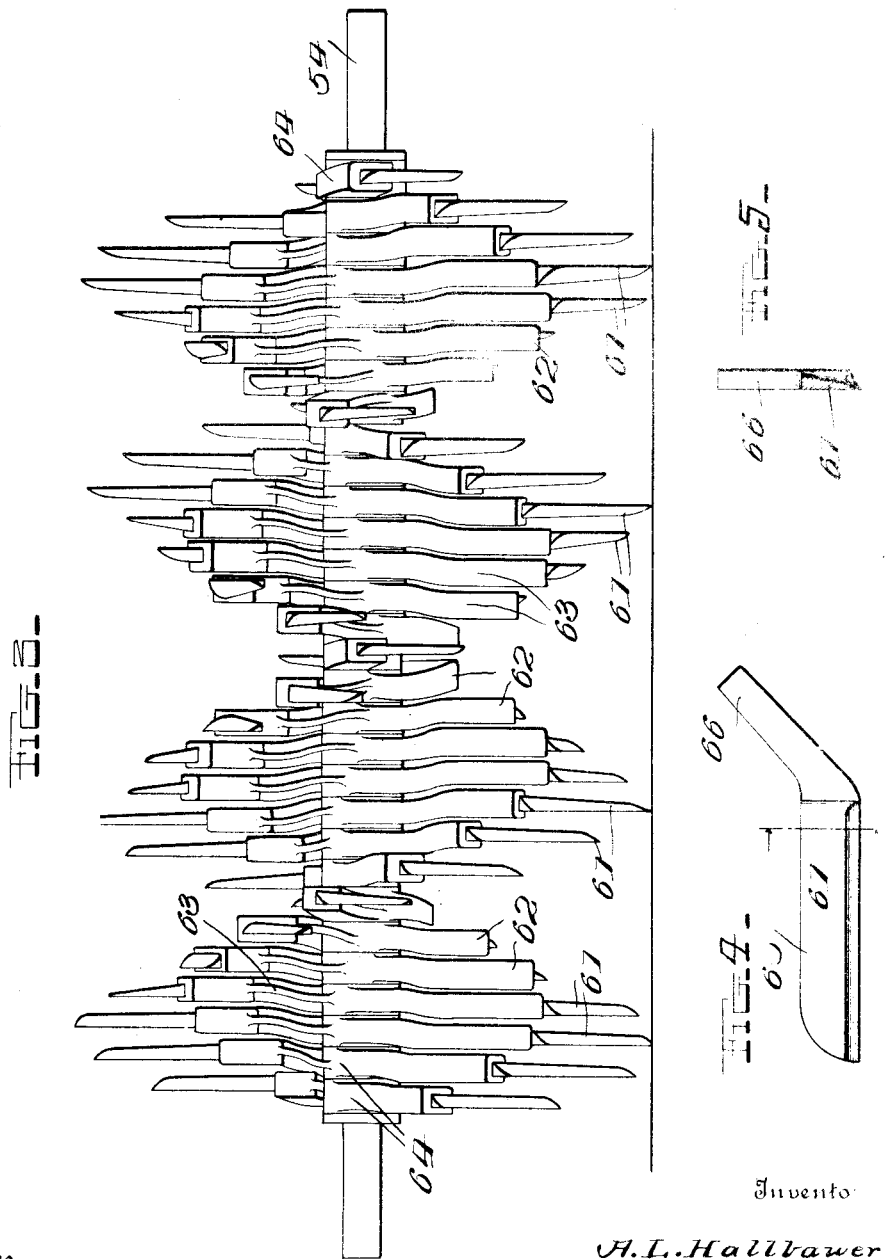

ALBERT L. HALLBAUER, OF TAMPA, FLORIDA, ASSIGNOR TO PALMETTO MACHINE COMPANY, INCORPORATED, OF BALTIMORE, MARYLAND, A CORPORATION OF MARYLAND.

ROOT-GRUBBING MACHINE.

1,089,213.  Specification of Letters Patent.  Patented Mar. 3, 1914.

Application filed June 28, 1913. Serial No. 776,376.

*To all whom it may concern:*

Be it known that I, ALBERT L. HALLBAUER, a citizen of the United States, residing at Tampa, in the county of Hillsboro and State of Florida, have invented certain new and useful Improvements in Root-Grubbing Machines, of which the following is a specification.

My invention relates to certain new and useful improvements in root grubbing machines, and more particularly to that type of machines which is adapted to cut into small pieces vines and roots lying upon or a short distance above or below the surface of the ground.

More particularly my invention relates to certain improvements in the type of root grubbing machine covered by my application Serial Number 591,014, filed November 7, 1910.

The particular improvements covered by this application relate to an improved form of cutter by which the piling up of the cut roots and loosened earth on one side of the machine is prevented, and the cut roots and loosened earth are more evenly distributed after the machine has passed thereover.

Still further features of my invention will be fully described in connection with the accompanying drawings, and then the invention particularly pointed out in the appended claims.

Referring to the drawings wherein I show the preferred embodiment of my invention, and wherein the same part is designated by the same reference numeral wherever it occurs, Figure 1 is a side elevation of the rear portion of the machine; Fig. 2 is a top plan view with the parts removed of the portion of the machine shown in Fig. 1; Fig. 2ᵃ is a view similar to Fig. 2 of the front portion of the machine which is omitted from Fig. 1; and Fig. 3 is an elevation of the cutter shaft and cutters thereon; Figs. 4 and 5 are detail views of a knife used on the cutter.

10, 10 designate the side members and 11, 11 the end members, which are bolted together to form a rigid rectangular frame. The frame is mounted upon a front roller 12, and rear rollers 13, 13, by which the machine is supported. The vehicle is guided by turning the roller 12 on its pivot 14 in any suitable or desired way, not shown. The particular construction of vehicle forms no part of the present invention, and only sufficient thereof is illustrated to enable one to understand the construction of my invention.

Mounted on the front portion of the frame of the machine, in any suitable manner, is an engine 15, the engine shown being an internal combustion engine, and provided with a main shaft 16. This shaft is shown as provided with a beveled gear 17, meshing with a gear 18, connected to the drum of a clutch 19, which may be of any desired type, to clutch and unclutch the transverse shaft 20 from the driving mechanism.

Mounted on the hub of the beveled gear 18 is a second gear 21, which meshes with the beveled gear 22 carried on the drum of a clutch 23, said clutch being of any ordinary or desired type, and adapted to clutch or unclutch the shaft 24 from the driving mechanism. The shaft 24 is shown as carrying fast thereon a gear 25, with one member 26 of a spur clutch formed thereon. A shaft 27 extends in line with the shaft 24, and feathered on this shaft are shown a pair of gears 28 and 29, which are adapted to mesh with the gears 30, 31, respectively, on a counter shaft 32. The counter shaft 32 also carries a gear 33 which is constantly in mesh with the gear 25 on the shaft 24. The gears 28 and 29 are engaged by a fork 39, carried by a rod 35 connected to the arm 36 fast on a rock shaft 37, connected to an operating lever 38. From this construction it will be seen that by the operation of the lever 38 the shaft 27 can be clutched directly to the shaft 24 by means of the spur clutch formed on the member 26 on the gear 25, and the member 39 extending from the gear 29, whereby the shaft 27 will be driven at the same rate of speed as the shaft 24. At this time the gears 28 and 29 will not mesh with the gears 30 or 31, and the counter-shaft 32 will consequently run idle. This form of gearing is adapted to run the vehicle with the roll 12 ahead and is the drive used for moving the machine from one place to another and when the cutters are not operating. When the cutters are operating the machine is run backward and at a slower rate of speed. By meshing the gears 28 or 29 with their gears 30, 31 respectively two rates of speed are provided, which will cause the machine to run backward.

Loosely mounted on the shaft 27 is a worm 40, which is adapted to be connected and disconnected to the shaft 27 by means of a spur clutch 41 operated by an arm 42, connected by a rod 43, to an arm 44 on a shaft 45, adapted to be operated by a treadle 46. The worm 40 meshes with a worm wheel 47, fast on the transverse shaft 48 which adjacent each end is provided with a sprocket wheel 49, from each of which extends a sprocket chain 50, running to a sprocket wheel 51 fast on each of the supporting rollers 13, whereby the rollers are driven from the shaft at a relatively low speed, and at a speed very much less than the speed of rotation of the shaft 20.

52, 52 designate a pair of arms loosely journaled on the ends of the shaft 53, upon which the rollers 13, 13 are also loosely mounted. Journaled in the outer ends of these arms is the cutter shaft 54. Fast on the ends of the cutter shaft are sprocket wheels 55, 55, connected by sprocket chains 56, 56, to sprocket wheels 57, 57 also loose on the shaft 53. Fast to the sprocket wheels 57 are the sprocket wheels 58, 58, connected by sprocket chains 59, 59 to the sprocket wheels 60, 60, mounted upon the ends of the shaft 20.

None of the particular form of mechanism thus far described forms any part of the subject matter of the present invention, and may be changed or modified as desired, it only being shown and described for the purpose of illustrating a mechanism which will drive the shaft 54 upon which the knives to be hereinafter described are mounted at a relatively high speed compared with the speed at which the vehicle is driven, it being essential to my invention that the knife-carrying shaft 54 be driven at a speed to give the knives a relatively high speed compared to the longitudinal movement of the vehicle.

The knives 61 are mounted upon the rotatable shaft 54, in a series of holders 62, each holder being provided with a pair of curved arms 63, which are mounted upon a hub 64, keyed to the shaft 54. The arms of the holders 62 are offset from one another in order that the knives which are held in opposite ends of the arms will be spaced apart laterally and cut at different points. Each knife comprises a broad tapering blade 65, projecting obliquely from a rectangular shaft 66, which is detachably supported in a socket formed in the end of each of the arms 62, and held in place by a set screw. The knives 65 are arranged in the opposed spirals about the rotary shaft, each spiral preferably making two complete turns. In order to support the knives in this manner the holders 62 of each spiral are progressively stepped about the shaft, so that each knife is evenly spaced from the other knives.

Preferably the spaces are such that there will be at least three knives in operation. The knives however are rotated so much faster than the longitudinal movement of the vehicle that all the knives will be brought into operative engagement with every inch of the ground traversed. By having the shaft 54 mounted in the arms 52 the knives may be raised or lowered as desired. A pair of chains 67 are respectively connected to the opposite arms 52, and pass over sprocket wheels 68, mounted in the outer ends of arms 69 and two sprocket wheels 70, mounted on the opposite ends of a shaft 71. The shaft 71 is rotated to raise or lower the knife shaft either by a hand wheel 72, operatively connected to the shaft 71, through a worm wheel 73 and a worm 74, or the shaft 75 on which the hand wheel 72 and the worm 74 is mounted may be rotated by mechanism which will now be described.

Mounted on the rear end of the shaft 27 is a sprocket 76, connected by a sprocket chain 77 to a sprocket wheel 78 fast on one side of the clutch 79, loosely mounted on a longitudinally extending shaft 80, mounted in journal brackets 81, 81, carried by the side member 10 of the frame. The opposing portion 82 of the clutch last referred to is feathered on the shaft 80, and is provided with the peripherally grooved collar 83, the groove of which is adapted to be engaged by the pins 84 extending into the groove from a fork lever 85. There is also preferably provided a rod 86, extending through the side frame 10, and having on its inner end a spring 87, which will normally tend to keep the portion 79 and 82 of the clutch disengaged.

Loosely mounted on the shaft 80 are a pair of opposed beveled gears 88, 89, which are always in mesh with the bevel gear 90, mounted on the end of the shaft 75. Each of the gears 88, 89, carry one member of a spur clutch 91—92, which are adapted to be alternately engaged by the opposed clutching faces of a clutch collar 93, provided with a groove 94, into which extends a pair of pins 95, carried by the bell crank lever 96, the bell crank lever being normally held by a spring 97 in position to cause the clutch to engage the gear 89, and the lever 96 is also preferably provided with an operative foot treadle 98. The gear 89 is adapted to drive the shaft 75 in a direction to lift the knives. The shaft 80 however is normally not driven because of the fact that the clutch members 82 and 69 are normally held disengaged. When however it is desired to raise the knives it is only necessary to operate the lever 85 to engage the clutch member, which will drive the shaft 75 in the direction to raise the knives. When, however, it is desired to lower the knives it is necessary to first depress the foot treadle 98, which will engage the gear 88 with the shaft 80, and then throw in the clutch. In order that the knives may be locked against upward displacement when in an operative position, or against downward movement when they are in an inoperative position, a locking mechanism is provided, which normally retains the knives in either their raised or lowered position, but which may be readily disengaged by a trip mechanism under the control of the operator. The locking mechanism shown comprises a lever 99, which is pivoted upon one of the arms 52, and extends upwardly through a slotted portion of a bracket 100, fast to one of the faces of the rearwardly extending arms 69. The lever 99 is provided with a plurality of notches 101, which are adapted to engage with the edge of the slot formed in the bracket 100, and lock the lever 99 in position. The lever 99 is normally forced against one edge of the slot by a spring-pressed pin 102, slidably mounted in the bracket 100 adjacent to the upper end of the lever 99. When the knives are in operative position a notch 101 will contact with the under face of the bracket 100 and prevent any upward displacement of the knives during the cutting operation. When the knives are raised in an inoperative position however the upper edge of the notch 101 will contact with the upper face of the bracket 100 and lock the knives in a raised position. In Fig. 1 the knives are shown in an intermediate position in which they may be supported. In order that the locking means may be readily disengaged to move the knives into and out of their various positions a trip 103 is pivotally mounted upon the bracket 100 adjacent one edge of the lever 99, and is oscillated to move the lever against the action of the spring pressed pin 102 by a foot treadle 104 connected by the arm 105 and rod 106 to the trip. Upon releasing the foot treadle 104 the spring pressed pin 102 immediately forces the lever 99 to one side and locks the lever upon engagement with any notch with the bracket 100.

A guard is preferably mounted above the revolving knives in order to prevent the cuttings and dirt which are thrown up by the knives from flying in all directions. The knife guard is composed of a semi-cylindrical casing which is supported between the arms 52 in any suitable manner.

I am aware that considerable variation is possible in the details of construction herein shown and described, without departing from the spirit of my invention, and I do not intend to limit myself thereto, except as pointed out in the following claims, in which it is my intention to claim all the novelty inherent in the structure shown and described as broadly as the state of the art will permit.

Having thus described my invention what I claim as new and desire to secure by Letters Patent is:

1. A root grubbing machine having, in combination, a vehicle, rotatable means mounted on the vehicle, a series of knives arranged in spiral formation about the rotatable means, the cutting edge of each of said knives being formed with a flat side and a beveled side, the knives on each side of the central portion of the spiral being arranged with their bevels facing the central portion of the spiral, the cutting edges of said knives facing outwardly and extending at an angle to the radii of the rotatable means, and means for rotating said knives at a greater speed than the longitudinal movement of the vehicle, whereby the knives produce a drawcut when entering and passing through the ground.

2. A root grubbing machine having, in combination, a vehicle, rotatable means mounted on the vehicle, a series of knives arranged in double spiral formation about the rotatable means, the cutting edges of said knives facing outwardly and extending at an angle to the radii of the rotatable means, and means for rotating said knives at a greater speed than the longitudinal movement of the vehicle, whereby the knives produce a drawcut when entering and passing through the ground.

3. A root grubbing machine having, in combination, a vehicle, rotatable means mounted on the vehicle, a series of knives arranged in two opposed spirals about the rotatable means, the cutting edges of said knives facing outwardly and extending at an angle to the radii of the rotatable means, and means for rotating said knives at a greater speed than the longitudinal movement of the vehicle, whereby the knives produce a drawcut when entering and passing through the ground.

4. A root grubbing machine having, in combination, a vehicle, rotatable means mounted on the vehicle, a series of knives arranged in two opposed spirals about the rotatable means, the spirals being arranged so that under the normal rotation of the knives they screw toward each other, the cutting edges of said knives facing outwardly and extending at an angle to the radii of the rotatable means, and means for rotating said knives at a greater speed than the longitudinal movement of the vehicle, whereby the knives produce a drawcut when entering and passing through the ground.

5. A root grubbing machine having, in combination, a vehicle, rotatable means mounted on the vehicle, a series of knives arranged in double spiral formation about the rotatable means, the cutting edges of said knives being beveled on one side and facing outwardly, and extending at an angle to the radii of the rotatable means, the bevels of one spiral opposing the bevels of the other spiral, and means for rotating said knives at a greater speed than the longitudinal movement of the vehicle, whereby the knives produce a drawcut when entering and passing through the ground, and the beveled edges of the knives in combination with the opposed spiral formation force the roots and earth toward the center.

In testimony whereof I affix my signature in presence of two witnesses.

ALBERT L. HALLBAUER.

Witnesses:
    JAS. M. HENDERSON,
    MARCUS E. SPERRY.